Dec. 12, 1967      W. P. ROWLAND      3,357,772
PHASED LENTICULAR SHEETS FOR OPTICAL EFFECTS
Filed Feb. 27, 1963      3 Sheets-Sheet 1
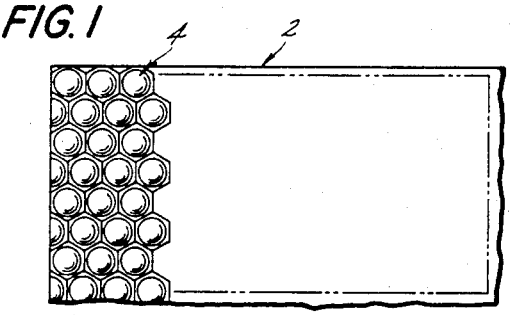
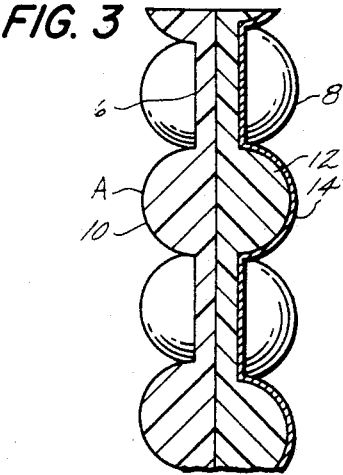
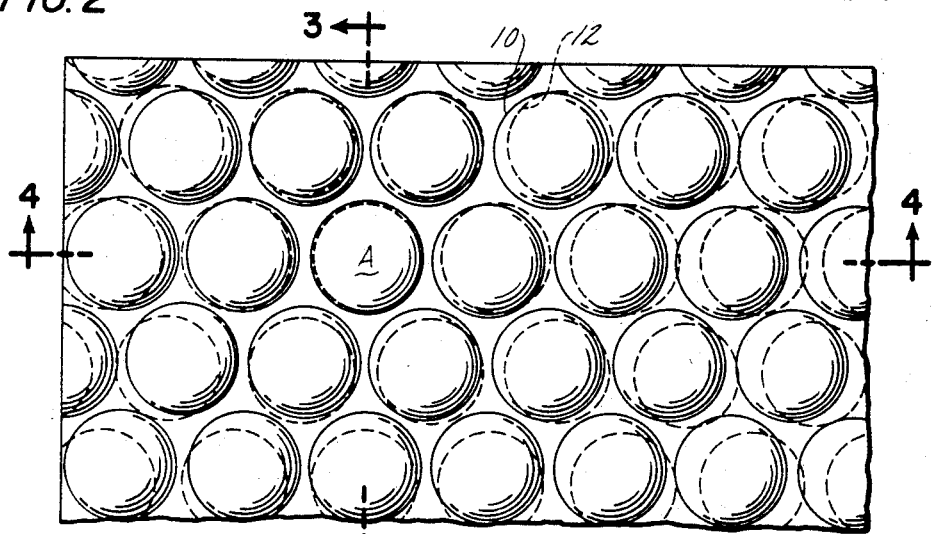
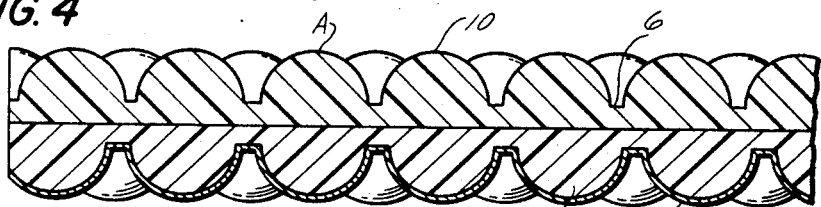
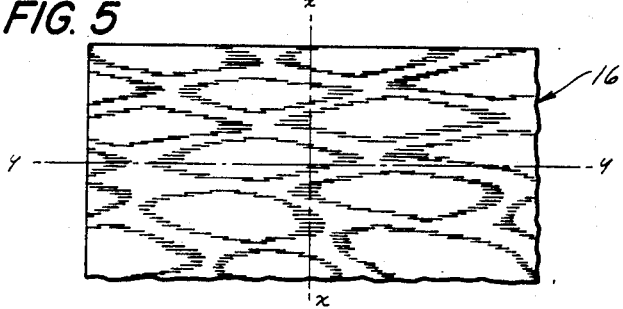
INVENTOR.
WILLIAM P. ROWLAND
BY
*Peter L. Costas*
ATTORNEY Dec. 12, 1967  W. P. ROWLAND  3,357,772
PHASED LENTICULAR SHEETS FOR OPTICAL EFFECTS
Filed Feb. 27, 1963  3 Sheets-Sheet 2
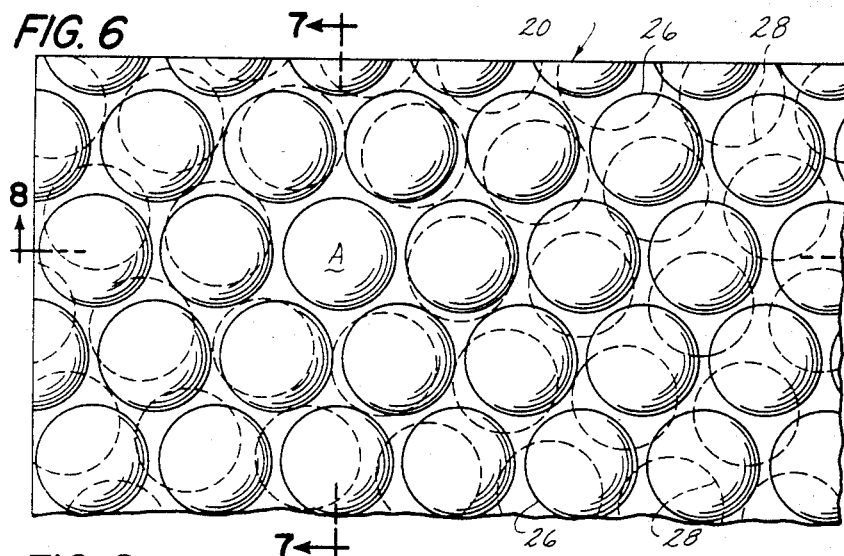
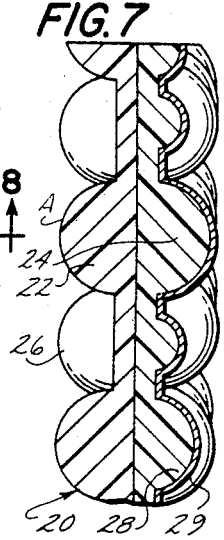
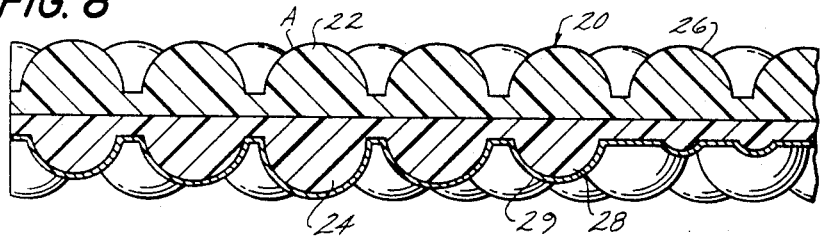
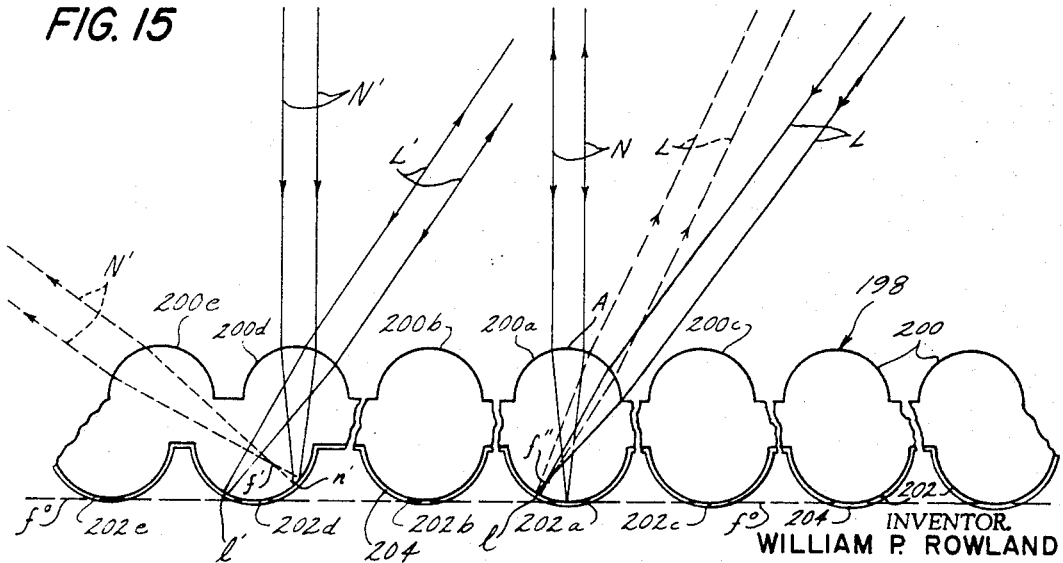
INVENTOR.
WILLIAM P. ROWLAND
BY
ATTORNEY Dec. 12, 1967     W. P. ROWLAND     3,357,772
PHASED LENTICULAR SHEETS FOR OPTICAL EFFECTS
Filed Feb. 27, 1963     5 Sheets-Sheet 3

INVENTOR.
WILLIAM P. ROWLAND
BY
*Peter L. Costas*
ATTORNEY

United States Patent Office 3,357,772
Patented Dec. 12, 1967

3,357,772
PHASED LENTICULAR SHEETS FOR
OPTICAL EFFECTS
William P. Rowland, Southington, Conn., assignor to
Rowland Products, Incorporated, Kensington, Conn., a
corporation of Connecticut
Filed Feb. 27, 1963, Ser. No. 261,385
14 Claims. (Cl. 350—167)

The present invention relates to synthetic plastic sheet material capable of producing a wide variety of optical effects.

It has heretofore been proposed to produce reflective or optical sheets or molded articles of synthetic plastic material having lenses or lenticular embossments upon one or both surfaces. Exemplary of such proposals are the United States Patents to Jungerson, Numbers 2,310,790 and 2,380,447; Boone, Number 2,700,919; Lemelson, Number 2,951,419; Waters, Number 2,330,096; Gabor, Number 2,351,034; and Chretien, Reissue 19,070. However, such materials have been intended to produce a high degree of retroreflection, interference effects or to substitute for conventional lens structures.

It is an object of the present invention to provide novel synthetic plastic sheet material which is capable of producing a wide range of optical effects with light rays falling thereon over a wide angle of incidence.

Another object is to provide novel and relatively economical synthetic plastic sheet material for reflective purposes which is capable of producing a significant degree of retroreflection of light rays falling thereon over a wide angle of incidence and also of providing sufficient light scattering and highlights at a wide angle of light incidence thereto so as to enable observation thereof by a viewer over a wide viewing angle substantially irrespective of the angle of the light rays falling thereon.

Still another object is to provide a novel and relatively economical decorative sheet material which is capable of a wide range of decorative optical pattern effects for use as display material, decorative trim and other applications where attention gathering is desirable or for use as a decorative and protective finish for elements such as building panels.

A further object is to provide relatively rigid panels incorporating the novel synthetic plastic sheet material of the present invention to produce a wide range of optical effects with light rays falling thereon over a wide angle of incidence.

Other objects and advantages will be apparent from the following detailed description and claims and the attached drawing wherein:

FIGURE 1 is a fragmentary plan view to the naked eye of the pattern in a strip of plastic sheet material embodying the present invention;

FIGURE 2 is a fragmentary plan view to a greatly enlarged scale of the strip in FIGURE 1 showing the embossments on the top surface in full line and the embossments on the rear surface in dotted line;

FIGURE 3 is a cross-sectional view along the line 3—3 of FIGURE 2;

FIGURE 4 is a cross-sectional view along the line 4—4 of FIGURE 2;

FIGURE 5 is a fragmentary plan view to the naked eye of the pattern in a strip of plastic material produced in accordance with another embodiment of the present invention;

FIGURE 6 is a fragmentary plan view to a greatly enlarged scale of strip produced in accordance with still another embodiment of the present invention and showing the embossments on the top surface in full line and the embossments on the rear surface in dotted line;

FIGURE 7 is a cross-sectional view along the line 7—7 of FIGURE 6;

FIGURE 8 is a cross-sectional view along the line 8—8 of FIGURE 6;

FIGURE 15 is a diagrammatic view showing the optical effects produced by reflector sheet material embodying the present invention.

Figure 9:
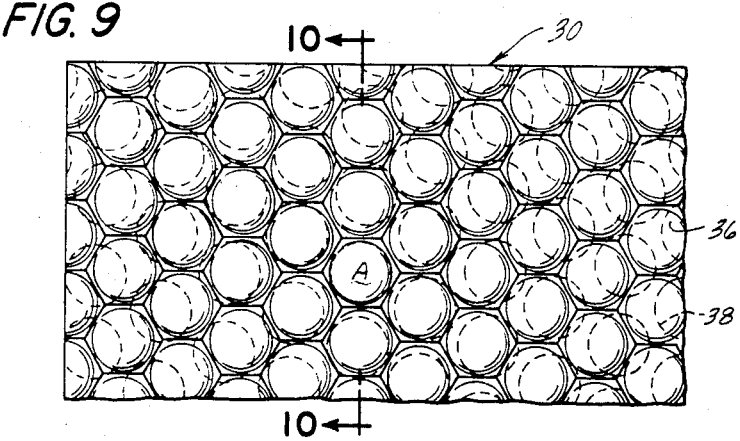
FIGURE 9 is a fragmentary plan view to an enlarged scale of a strip of plastic sheet material produced in accordance with a further embodiment of the present invention.

It has now been found that the foregoing and related objects can be readily attained by synthetic plastic sheet material having a body portion of substantial length and width dimensions providing a front surface and being of substantially uniform thickness which has extending in axes perpendicular to the front surface thereof a multiplicity of closely spaced curvilinear lens-like formations and a multiplicity of closely spaced reflective formations on a parallel plane spaced therefrom. The formations of each surface are substantially identical and diminish in horizontal cross section along the vertical and horizontal axes from a major portion, i.e., that diminish in cross section outwardly from the body portion, to provide side walls which taper inwardly from the major portion towards the vertical axes of the formation along the horizontal axes of the sheet material and the lens-like formations are curvilinear along both horizontal and vertical axes. The reflective formations phase in and out of axial registry with the lens-like formations along the horizontal axes of the sheet material so that varying optical effects are produced by variations in the angle of incidence of light rays focused by the lens-like formations onto the tapering side walls of the reflective formations.

Although concave depressions might be used to provide the lens-like and reflective formations, they are subject to objections because of the divergence of the light rays produced thereby and the tendency to become fouled readily by dust and contamination as well as because of reduced retroreflective action. Conversely, convex lens-like embossments, i.e., having a convex vertical cross section, have proven highly effective in providing convergence of light rays and a relatively high degree of retroreflections as well as exhibiting a reduced tendency towards fouling by dust and other contamination. It will be readily apparent that multiple-stage formation may locate the reflective formations in a plane parallel to the front surface and spaced therefrom but within the body of the sheet material. However, from the standpoints of ease of production and operability when no reflective coating is employed, it is generally desirable to produce the reflective formations as embossments on the sheet material at least initially, although they may, in some instances, thereafter have additional plastic material placed thereon either after a reflective coating has been applied thereto or in a fashion to maintain substantially the air interface and reflective action.

By providing a reflective metallic coating on the reflective formations instead of relying entirely upon the critical angle for reflection, the sheet material may be rendered more highly reflective and even more optically interesting due to accentuation of highlights and due to accentuation of reflection of incident light rays. However, either the critical angle for reflection or a reflective coating where such critical angle is not employed or the combination thereof may be utilized to provide reflection of the predominant portion of the light rays impinging upon the tapering side walls of the reflective embossments. The phasing in and out of axial alignment of the lens and reflector formations within each node or phase of the pattern produces a multiplicity of areas of dazzling brightness due to reflection of the light in bundles of parallel rays and also effectively ensures a number of lens and reflector combinations to retroreflect light rays over a wide angle of incidence.

As will be readily appreciated, the synthetic plastic sheet material of the present invention may include dyes to impart various colors or tones thereto. Alternatively, the reflective coatings may be dyed or colored or colored lacquer coatings may be applied.

Generally, the lens-like embossments are each of a configuration which will focus substantially the light rays entering thereinto from various directions and, accordingly, have a curvilinear convex periphery and horizontal cross section i.e., they are curvilinear in cross section in planes which include the perpendicular axes of the embossments and in planes which extend through such perpendicular axes. Although parabolic configurations are the more highly efficient focusing elements, major segments of spheres, preferably approximating hemi-spheres, have also proven highly effective. Since some distortion of the spherical configuration may occur and be tolerated in the present invention, the term "spheroidal" is used herein to encompass both spherical configurations and those configurations deviating somewhat therefrom. Although the embossments on the other or rear surface may be prismatic or conical in configuration, it is far more preferable to employ lens-like embossments to obtain considerably greater optical activity and greater reflection as well as retroreflection. When the rear surface is not metallized, the side walls of the embossments on the rear surface should taper steeply to ensure a high degree of reflection of the light rays impinging thereon. When the rear surface has a reflective coating and lens-like embossments are employed on the rear surface, the convex side walls of the rear embossments may taper more gradually to obtain greatest reflection from the center of the lens-like embossments forming the mirrors.

The embossments must be of relatively small width and closely spaced so as to obtain the repetitve phasing in and out of axial registry within relatively short distances. Generally, the embossments must be less than about 0.040 inch in width to achieve the desired effect and preferably less than about 0.025 inch. To maintain close spacing and to minimize flats between embossments, a hexagonal pattern of embossments is desirably employed.

To phase the embossments of the rear surface in and out of axial registry with the lens-like embossments of the front surface, the vertical misalignment of the two embossments must progressively vary along any given line or horizontal axis of the sheet material. This may be effected by variation in the relative spacing between centers of adjacent embossments in the two surfaces, by the combination of shape and spacing of the embossments on the two surfaces, or by arranging patterns of similar embossments along different or diverging linear axes of the sheet. However, the spacing between centers of embossments on one surface should not deviate from the spacing between centers of embossments on the other surface by more than about 10 percent, and preferably not more than about 7 percent, in order to maintain relatively large linear length to a single node or complete phase and also to ensure optimum reflection or retroreflection over a wide angle of light incidence. By having greater spacing, on centers, on the rear surface, the pattern appears to be one which stands out of the sheet material whereas greater spacing, on centers, of the embossments in the top surface presents an appearance of concavity or depth. By variation in differential spacing in the major axes, a moire or diffuse pattern can be obtained.

The thickness of the sheet material is largely dependent upon the focal length of the lens-like embossments of the front surface (and of the rear surface when lens-like embossments are employed thereon). For purely decorative effect, the total thickness of the sheet material may vary from about one-half two and one-half times the focal length of the lens-like embossments on the front surface. For retroreflective purposes with lens-like embossments and a reflective coating on the rear surface, the thickness of the sheet should be substantially equal to the focal length of the lens-like embossments on the front surface causing the light rays to focus at about the centers of the reflective embossments or to the sum of the focal lengths of the lens-like embossments on the front surface and the lens-like "mirrors" on the rear surface, the former being optimum for maximum retroreflectivity. However, a measure of variation and deviation is tolerable in the present invention since constant axial phasing over the axes of the sheet will result in refracted light rays striking and focusing at various points along the convexly curved surfaces of the rear lens-like projections of each period or phase so as to achieve a significant amount of retroreflection from one or more combinations of embossments in various degrees of axial registration in a single phase or period of the pattern.

Various synthetic plastics may be used for the plastic sheet material of the present invention, including acrylic acid esters such as methyl methacrylate, cellulose acetate, cellulose acetate butyrate, cellulose propionate, vinyl chloride and copolymers thereof, polystyrene, polycarbonates, cellulose nitrate, polypropylene and polyethylene. Laminates may be desirable to provide more highly weather- and abrasion-resistant surfaces such as by use of very thin surface films of polyethylene terephthalate.

The reflective coating on the rear surface is preferably a metallic coating applied by chemical deposition or by vacuum metallizing, although the reflective coating may be provided by a metallized synthetic plastic film laminated or bonded into intimate overall surface contact with the rear surface of the sheet material. When a metallic coating is applied, it is highly desirable to provide protection therefor by a superposed coating of lacquer, plastic film or other means.

Although the sheet material of the present invention may be used per se for various purposes such as decorative or reflective elements in planar state or by forming it into non-planar forms, it may also be mounted upon or laminated to substrates of various types for a wide range of uses such as building panels, rigid reflector elements and rigid or moving signs. When the sheet material is laminated or bonded to a substrate, it is desirable to employ a synthetic plastic material which will fill the spaces about the embossments on the rear surfaces without injuring or distorting the sheet material or its optical properties. In this manner, distortion of the rear embossments may be avoided. However, where the rear surface has not been metallized, then substantial destruction of reflective power of the rear embossments should be avoided as by maintaining substantially the air interface by merely bonding the peaks of the embossments to the substrate. Similarly, a protective facing of transparent material may be bonded to or spaced from the peaks of the lens-like embossments of the front surface to preclude dust, dirt and other contamination from the minute, lens-like embossments and greatly reduce their optical properties.

Although it might be possible to emboss the two surfaces of a single sheet by a pair of embossing rollers, there is considerable difficulty in obtaining good flow and formation of the synthetic plastic of the relatively thin sheeting in the engraved recesses of the rollers so that well-formed embossments which are substantially identical across each surface are obtained. Moreover, some difficulty may also be experienced due to surface slippage and flow in maintaining the desired degree of non-registry of the embossing patterns to obtain the desired phasing along the several axes of the sheet material. It has been found that optimum formation of the embossments, and particularly the lens-like embossments, and practical control of the non-registry may be obtained by laminating back-to-back two strips of sheet material each embossed on one surface under conditions which produce no significant distortion of the embossments, the lamination being conveniently effected by use of solvent for the sheet material and relatively light pressure applied by rubber pinch rolls. The desired phasing of the embossments can be assured by use of two different embossing rolls having different patterns by reason of embossments which are of different spacing and/or in patterns along different axes. Alternatively, the same embossing roll may be used for both strips and then one of the strips may be stretched or shrunk to a controlled degree which will generally elongate or shrink the web in the spacing between embossments due to the thinner section. Also, the pattern of the embossments on a single roll may be at a predetermined angle to the axis thereof so that the reversal of two strips produced thereby will result in embossed patterns running along differing or diverging axes.

Referring now in detail to the attached drawings, FIGURES 1–4 illustrate one embodiment of the plastic sheet material produced in accordance with the present invention and generally designated by the numeral 2. In FIGURE 1, the apparent visual pattern to the naked eye of the sheet material 2 is illustrated as comprised of a multiplicity of spheres generally designated by the numeral 4 and arranged in a repeating hexagonal pattern. In the greatly enlarged views of FIGURES 2–4, the structure of the sheet material 2 may be seen to be comprised of a pair of layers of plastic material 6, 8 bonded back to back and each having a multiplicity of semi-spherical embossments 10, 12 similarly arranged in hexagonal patterns. The spherical embossments 10, 12 of both layers 6, 8 are closely spaced, the actual spacing having been enlarged in the drawings to facilitate illustration. Since the engraving of the embossing roll for intersecting embossments will provide pointed intersections between adjacent depressions which may fracture or wear unevenly, the surface of the roll preferably is polished slightly to remove the pointed intersections, thus resulting in slight planar spacing between adjacent embossments.

In this embodiment, the layers 6, 8 each employ embossments 10, 12 of substantially identical size and configuration but the spacing between centers of adjacent embossments 12 on the bottom surface is greater along all axes of the strip than the spacing between the top embossments 10. In this manner, the embossments 10, 12 of the top and bottom layers will phase in and out of axial registry along the several axes of the strip 2. Thus, at point A, embossments 10, 12 in the two layers are perfectly aligned. However, radially outwardly in all directions therefrom, the vertically "registering" pairs of embossments first increase in misalignment and then reduce therefrom until axial registry is again obtained. The rear surface of the strip 2 has a thin metallic coating or layer 14 applied thereto, conveniently by vacuum metallizing, to provide greatly increased reflection of light rays striking the rear surface over wider angles of incidence. As previously indicated, the deviation in spacing may be accomplished by use of different embossing rolls having differing patterns or by stretching or shrinking one of the layers 6, 8 to a controlled degree.

In the embodiment of FIGURE 5, the strip generally designated by the numeral 16 has an elongated pattern of a moire type and similarly is comprised of a pair of layers (not shown) each having substantially identical closely spaced semi-spherical embossments (not shown). The lower layer, however, has a greater spacing, on centers, of the embossments in the direction XX than in the direction YY, and the spacing in both directions XX and YY is greater than the spacing on centers in the top layer.

In the embodiment of FIGURES 6–8, the strip generally designated by the numeral 20 is similarly comprised of a pair of layers 22, 24 each having a multiplicity of semi-spherical embossments 26, 28, and the bottom layer 24 has a reflective metallic coating 29. In this embodiment, the pattern of embossments for the two layers 26, 28 are identical but one layer is twisted to a small angle about a point prior to lamination. In this manner, the embossments 26, 28 are axially aligned at point A but phase in and out of axial alignment radially outwardly therefrom.

Figure 10:
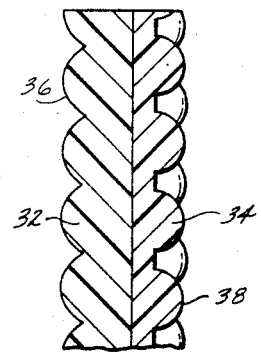
FIGURE 10 is a cross-sectional view to a greatly enlarged scale of the plastic strip of FIGURE 9.

In the embodiment of FIGURES 9 and 10, the strip generally designated by the numeral 30 is again comprised of two layers 32, 34 but the embossments 36 at the top layer 32 are of parabolic configuration as best seen in FIGURE 9 and the embossments 38 of the rear layer 34 are of generally semi-spherical configuration. The spacing on centers of the embossments 38 is greater than the spacing of the embossments 36 so that the lens-like embossments 36, 38 will move out of axial registry along the various axes from the point A.

Figure 11:
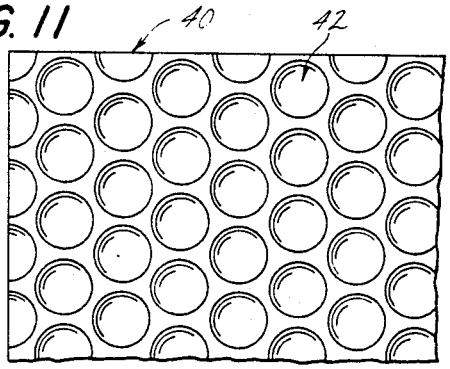
FIGURE 11 is a fragmentary plan view to the naked eye of the pattern in a strip of plastic sheet material in accordance with a further embodiment of the present invention.
Figure 12:
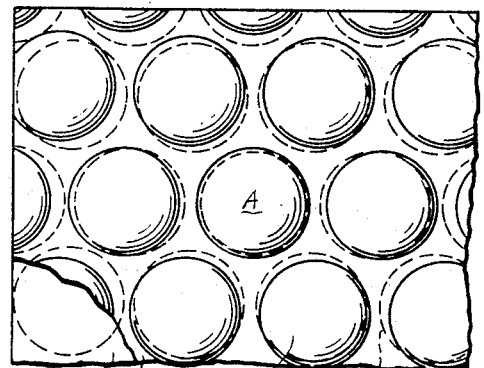
FIGURE 12 is a fragmentary plan view to a greatly enlarged scale of the strip in FIGURE 11 similar to FIGURE 2.

In the embodiment of FIGURES 11 and 12, a different visual effect is obtained in the strip generally designated by the numeral 40 wherein the pattern to the naked eye shown in FIGURE 11 appears to be one having a multiplicity of crater- or cup-like depressions generally designated by the numeral 42. The strip 40 is again comprised of two layers of plastic sheet material 44, 46 each having a multiplicity of semi-spherical embossments 48, 50. The embossments 48 of the top layer 44 are more widely spaced than the bottom embossments 50 of the layer 46 to result in the apparent image of the cup-like depressions 42.

Figure 13:
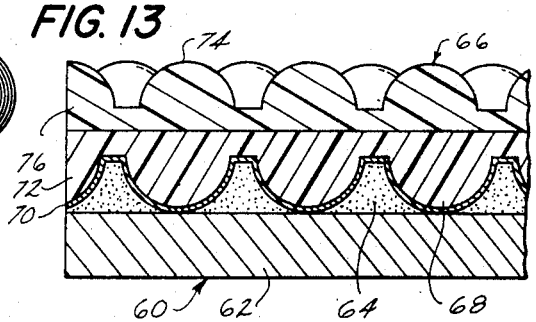
FIGURE 13 is a cross-sectional view to a greatly enlarged scale of a panel having still another embodiment of plastic sheet material mounted thereon.

In FIGURE 13, a rigid reflective panel generally designated by the numeral 60 is shown as comprised of a metal substrate 62 to which has been bonded by adhesive 64 a strip of the sheet material of the present invention generally designated by the numeral 66. The adhesive 64 fills the cavities between the embossments 68 and protects the metallic layer 70 on the bottom surface of the layer 72. In this embodiment, it can be seen that the semi-spherical embossments 74 of the top layer 76 are of smaller diameter than the embossments 68 of the bottom layer 72.

Figure 14:
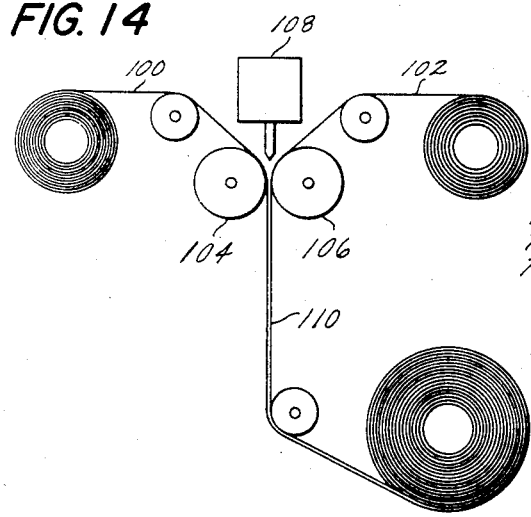
FIGURE 14 is a diagrammatic representation of a method employed for making the plastic sheet material of the present invention.

A highly effective method of making the sheet material of the present invention is diagrammatically illustrated in FIGURE 14. Two strips 100, 102 of plastic sheet material each embossed on one surface and having patterns which will ensure the desired phasing are passed back to back between a pair of rubber pinch rolls 104, 106 as solvent from the supply 108 is applied to their mating surfaces to soften the surfaces for lamination by the rolls 104, 106. The rubber pinch rolls 104, 106 apply sufficient pressure to bond firmly the tacky surfaces of the two strips 100, 102 without materially injuring the embossments thereon. After lamination, the composite strip 110 is then coiled and the residual solvent is allowed to evaporate therefrom.

Referring now to the diagrammatic view of FIGURE 15 for an understanding of the operation of the present invention by reference to a single axis, the sheet material 198 is similar to that illustrated in FIGURES 1–4. The total thickness of the sheet material is approximately equal to the focal length of the lens-like embossments 200 of the front surface as indicated by the focal plane f°. At point A, the top and bottom embossments 200a, 202a are in axial alignment. The pairs of embossments 200b, 202b and 200c, 202c are slightly out of axial alignment due to the difference in spacing, on centers, of the embossments 200, 202. At a greater distance outwardly from the point A, the embossments 200d, 202d deviate substantially from axial alignment.

Rays of light N normal to the front surface striking the axially aligned embossments 200a are refracted and focused substantially onto the center of the embossment 202a at the focal plane f° and are reflected by the metallic coating 204 parallel to the original path so as to provide retroreflection. The rays of light N' also normal to the front surface and striking the axially unaligned embossment 200d are refracted to an area n' on the concave side surface of the embossment 202d at an angle deviating from normal to the tangent at this area. Since the focal plane f° is spaced beyond the area n', the rays N' are reflected to a focal area f' equal in spacing thereto and from which the rays begin to diverge as indicated in broken line. Eventually the rays N' exit through the adjacent embossment 200e at an angle deviating considerably from normal to the sheet 198, thus providing illumination at an angle considerably distinct from that of the source of light. This same light scattering will occur to greater or lesser degree of angularity at other pairs of embossments within each series or phase in all axes of the sheet material 198.

However, the sheet material 198 is retroreflective not only to light rays normal to the front surface. The rays L at an acute angle thereto when refracted by the embossment 200a will not be focused into the focal plant f° of the embossment 202a but to an area l on the concave side surface at an angle deviating from normal to the tangent thereat. Since the focal plane f° is spaced therefrom, the rays L are reflected to the focal point f" equal in spacing thereto from which the rays L begin to diverge as indicated in broken line.

However, rays L' striking the embossment 200d at the same angle to the normal as that of the rays L are refracted and focused to the area l' on the concave side surface of the axially displaced embossment 202d. The rays L' strike the concave surface at an angle normal to a tangent thereat and are reflected back along parallel paths to produce retroreflection.

Since rays at substantially any given angle will similarly focus and strike the concave surfaces of the reflective rear embossments of a series or phase normal to a tangent thereat, retroreflection will be provided thereby while other reflective rear embossments will provide light scattering so as to make the sheet material visible over a wide viewing angle deviating from the angle of the light source.

In the instance of sheet material not having a reflective coating on the rear surface, this same wide variation in the angle of incidence of parallel light rays striking various portions of the sloping surfaces of the rear embossments at various angles of incidence will provide areas wherein the angle of incidence is greater than the critical angle so that the light rays are totally reflected to produce highlights and light scattering.

Indicative of the efficacy of the present invention is the following specific example.

*Example*

An embossing roll was prepared having substantially hemi-spherical cavities therein of about 0.016 inch diameter arranged in a hexagonal pattern substantially as shown in FIGURES 1–4 with a spacing between centers of about 0.018 inch. Cellulose butyrate sheet material was extruded into the nip between the embossing roll and a rubber backup roll to provide an embossed strip of about 0.013 inch thickness substantially as shown for the top layer in FIGURE 2. The focal length of the embossments was determined to be about 0.026 inch.

A portion of the strip was stretched both longitudinally and transversely about 4 percent which resulted in a strip substantially as shown for the bottom layer in FIGURES 2–4. Acetone was applied to the back or unembossed surfaces and the two strips were laminated together between rubber rolls. Subsequently, the surface formed by the stretched layer was provided with a vacuum metallized coating of aluminum and then a protective coating of lacquer was applied thereto.

The resultant sheet material had a brilliant pattern of apparent spheres arranged in a hexagonal pattern substantially as shown in FIGURE 1.

For unusual and striking displays or signs, printing or designs may be applied on the surface having the lens-like embossments and the image will appear to stand out from or lie within the body of the sheet material depending upon the relative spacing of the top and bottom embossments. When the reflective surface has no metallic reflective coating, the printing may be applied thereto with generally similar effect. The image will also appear to move about the surface as the viewing angle is changed. Because of the excellent reflective properties of the preferred sheet material, it is an optimum reflective material for emergency or street signs since illumination from substantially any source will be retro-reflected in part and scattered in part to provide illumination of the sign over a wide viewing angle. Moreover, during the daytime or when light is striking the surface from a number of sources or over a wide angle such as in daylight, the sheet material nevertheless will produce highlights to attract attention.

By mounting on panels sheet material employing more subdued patterns, ideal structural units can be provided wherein the plastic sheet material will not only be ornamental but also serve as a protective surface. Various other applications for such material will be readily apparent in view of the wide range of optical effects which may be obtained thereby.

Thus, it can be seen from the foregoing detailed specification that the present invention provides a sheet material which is capable of a wide range of optical effects with light rays falling thereon over a wide angle of incidence which may be used not only for highly effective decorative purposes but also for very useful and relatively economical reflectors since it enables observation over a wide viewing angle substantially irrespective of the angle of the light rays. The sheet material may be used in combination with substrates to provide relatively rigid panels such as for construction.

Having thus described the invention, I claim:

1. Synthetic plastic material for producing optical effects having a body portion of substantial length and width dimensions providing front and rear surfaces, said material being of substantially uniform thickness and having a multiplicity of closely spaced curvilinear lens-like embossments on the front surface thereof, each lens-like embossment projecting on an axis perpendicular to said front and rear surfaces, said material also having a multiplicity of closely spaced reflective embossments on said rear surface, each reflective embossment projecting on an axis perpendicular to said front and rear surfaces, each of said lens-like and reflective embossments diminishing in cross-section outwardly from said body portion in all planes which include its perpendicular axes to provide side walls tapering inwardly from said body portion towards each perpendicular axis, each of said lens-like embossments being curvilinear in cross section in all planes which include its perpendicular axis and in all planes which extend normally through its perpendicular axis, said reflective embossments phasing in and out of axial registry with said lens-like embossments in at least one direction of said surfaces to provide varying optical effects due to variation in the angle of incidence of light rays focused by said lens-like embossments of said front surface onto the tapering side walls of the reflective embossments of said rear surface, the center-to-center close spacing of said lens-like embossments deviating not more than 10 percent from the center-to-center close spacing of said reflective embossments, said close spacing of said lens-like and reflective embossments precluding any bands of flat surface therebetween in any direction of said surfaces, said tapering side walls of said reflective embossments reflecting the predominant portion of light rays impinging thereon, said material being of a thickness to effect substantial focusing of light rays passing through said lens-like embossments and impinging upon said reflective embossments for substantial reflection thereof.

2. The material of claim 1 wherein said reflective embossments have a reflective coating thereon providing said reflecting of the predominant portion of light rays impinging thereon.

3. The material of claim 1 wherein said reflective embossments have side walls tapering at an angle greater than the critical angle for reflection in said synthetic plastic to provide said reflecting of the predominant portion of light rays impinging thereon.

4. The material of claim 1 wherein said lens-like embossments are substantially parabolic in cross section in planes including said perpendicular axes.

5. The material of claim 1 wherein said reflective embossments are of curvilinear lens-like configuration similar to the configuration of said lens-like embossments on said front surface.

6. The material of claim 1 wherein the center-to-center spacing of the lens-like embossments differs from the center-to-center spacing of the reflective embossments in at least said one direction of said surfaces to provide the phasing in and out of axial alignment in said one direction.

7. The material of claim 1 wherein said lens-like embossments and said reflective embossments are arranged in patterns having at least two axes and wherein at least one axis of said pattern of said lens-like embossment is at an angle to at least one axis of said pattern of said reflective embossments to provide the phasing in and out of alignment of said lens-like and reflective embossments.

8. The material of claim 1 wherein the distance between the outer surfaces of said lens-like and reflective embossments is substantially equal to the focal length of said lens-like embossments so as to provide a thickness for said material effecting said substantial focusing of light rays passing through said lens-like embossments and impinging upon said reflective embossments for substantial reflection thereof.

9. The material of claim 2 wherein the distance between the outer surfaces of said lens-like and reflective embossments is substantially equal to the sum of the focal length of said lens-like embossments and the focal length of said reflectively coated reflective embossments.

10. Synthetic plastic material for producing optical effects having a body portion of substantial length and width dimensions providing front and rear surfaces, said material being of substantially uniform thickness and having a multiplicity of closely spaced curvilinear lens-like embossments on the front surface thereof, each lens-like embossment projecting on an axis perpendicular to said front and rear surfaces, said material also having a multiplicity of closely spaced reflective embossments on said rear surface of lens-like configuration similar to the embossments on said front surface and each projecting on an axis perpendicular to said front and rear surfaces, each of said lens-like and reflective embossments diminishing in cross-section outwardly from said body portion in all planes which include its perpendicular axis to provide side walls tapering inwardly from said body portion towards its perpendicular axis, each of said lens-like and reflective, embossments being curvilinear in cross section in all planes which include its perpendicular axis and in all planes which extend normally through its perpendicular axis, said reflective embossments phasing in and out of axial registry with said lens-like embossments in at least one direction of said surfaces to provide varying optical effects due to variation in the angle of incidence of light rays focused by said lens-like embossments of said front surface onto the tapering side walls of the reflective embossments of said rear surface, the center-to-center close spacing of said lens-like embossments deviating not more than 10 percent from the center-to-center close spacing of said reflective embossments, said close spacing of said lens-like and reflective embossments precluding any bands of flat surface therebetween in any direction of said surfaces, said side walls of said reflective embossments tapering at an angle greater than the critical angle for said synthetic plastic to reflect the predominant portion of light rays impinging thereon, the distance between the outer surfaces of the embossments of the front surface and the embossments of the rear surface being substantially equal to the focal length of said lens-like embossments of said front surface to effect substantial focusing of light rays passing through said lens-like embossments onto the walls of said reflective embossments for substantial reflection thereof.

11. The material of claim 10 wherein said lens-like embossments are substantially parabolic in cross section in planes including said perpendicular axes.

12. The material of claim 10 wherein said reflective embossments have a reflective coating thereon providing said reflecting of the predominant portion of light rays impinging thereon.

13. The material of claim 10 wherein the center-to-center spacing of the lens-like embossments differs from the center-to-center spacing of the reflective embossments in at least said one direction of said surfaces to provide the phasing in and out of axial alignment in said one direction.

14. The material of claim 10 wherein said lens-like embossments and said reflective embossments are arranged in patterns having at least two axes and wherein at least one axis of said pattern of said lens-like embossments is at an angle to at least one axis of said pattern of said reflective embossments to provide the phasing in and out of alignment of said lens-like and reflective embossments.

References Cited

UNITED STATES PATENTS 2,951,419   9/1960   Lemelson _____ 88—82.

OTHER REFERENCES

"Unlighted Signs That Shine," Rohm and Haas Reporter, p. 2, March-April 1952.

JEWELL H. PEDERSEN, *Primary Examiner.*

A. A. KASHINSKI, *Assistant Examiner.*